United States Patent
D'Souza et al.

(10) Patent No.: US 9,172,711 B2
(45) Date of Patent: *Oct. 27, 2015

(54) ORIGINATOR PUBLISHING AN ATTESTATION OF A STATEMENT

(71) Applicant: PivotCloud, Inc., Sunnyvale, CA (US)

(72) Inventors: Roy Peter D'Souza, Belleview, WA (US); Santosh S. Shanbhag, Saratoga, CA (US)

(73) Assignee: PivotCloud, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,142

(22) Filed: Nov. 24, 2014

(65) Prior Publication Data

US 2015/0082045 A1 Mar. 19, 2015

Related U.S. Application Data

(63) Continuation-in-part of application No. 14/171,682, filed on Feb. 3, 2014, now Pat. No. 8,976,967, which is a continuation of application No. 13/716,351, filed on Dec. 17, 2012, now Pat. No. 8,681,992, which is a (Continued)

(51) Int. Cl.
*H04L 9/00* (2006.01)
*H04L 9/32* (2006.01)

(Continued)

(52) U.S. Cl.
CPC ............ *H04L 63/123* (2013.01); *H04L 9/0891* (2013.01); *H04L 9/3247* (2013.01)

(58) Field of Classification Search
CPC ....... H04L 9/3281; H04L 9/14; H04L 9/0833; H04L 9/0825; H04L 9/08; H04L 9/30; G06F 21/72; G06F 21/10; G06F 21/30

USPC .......... 713/176, 179, 189; 380/277–279, 283, 380/44, 45; 726/26–27, 30

See application file for complete search history.

(56) References Cited

U.S. PATENT DOCUMENTS 7,286,665 B1  10/2007  Wang
7,298,851 B1 * 11/2007  Hendricks et al. ............ 380/282

(Continued)

OTHER PUBLICATIONS

Van Dijk, Juels: On the Impossibility of Cryptoraphy Alone for Privacy-Preserving Cloud Computation. Usenix Hotsec10 2010.

(Continued)

*Primary Examiner* — Hosuk Song
(74) *Attorney, Agent, or Firm* — Brian R. Short

(57) ABSTRACT

Methods, systems and apparatuses for an originator publishing an attestation of a statement are disclosed. One method includes obtaining information, wherein the information includes the attestation of the statement, wherein the statement includes at least a portion of the information to be attested to, and wherein the attestation includes a context describing conditions of the attestation, and wherein the attestation includes a cryptographic signature of the context and the statement. The method further includes validating the information. The method further includes communicating after validating the information the information to a destination while maintaining at least one of data privacy or data provenance, including creating a new statement by transforming the statement to a form suitable for the destination, creating, by the computing device, a new attestation by signing the new statement with a new context specific to the computing device, and making available the new attestation to the destination.

25 Claims, 8 Drawing Sheets

Related U.S. Application Data continuation-in-part of application No. 13/613,080, filed on Sep. 13, 2012, now abandoned.

(60) Provisional application No. 61/598,071, filed on Feb. 13, 2012.

(51) Int. Cl.
*H04L 29/06* (2006.01)
*H04L 9/08* (2006.01)

(56) References Cited

U.S. PATENT DOCUMENTS

| | | | |
|---|---|---|---|
| 7,328,351 B2 | 2/2008 | Yokota et al. | |
| 7,328,453 B2 * | 2/2008 | Merkle et al. | 726/23 |
| 7,359,884 B2 * | 4/2008 | Ta et al. | 705/59 |
| 7,475,256 B2 * | 1/2009 | Cook | 713/189 |
| 7,711,647 B2 | 5/2010 | Gunaseelan et al. | |
| 8,359,473 B1 | 1/2013 | Sorotokin et al. | |
| 8,566,247 B1 | 10/2013 | Nagel et al. | |
| 8,681,992 B2 * | 3/2014 | D'Souza et al. | 380/277 |
| 8,976,967 B2 * | 3/2015 | D'Souza et al. | 380/277 |
| 2006/0129847 A1 | 6/2006 | Pitsos | |
| 2008/0059787 A1 | 3/2008 | Hohenberger et al. | |
| 2009/0210697 A1 | 8/2009 | Chen et al. | |
| 2010/0017627 A1 | 1/2010 | Princen et al. | |
| 2010/0169656 A1 | 7/2010 | Yoshida et al. | |
| 2011/0055552 A1 | 3/2011 | Francis et al. | |
| 2011/0119481 A1 | 5/2011 | Auradkar et al. | |
| 2011/0145580 A1 | 6/2011 | Auradkar et al. | |
| 2011/0145593 A1 | 6/2011 | Auradkar et al. | |
| 2012/0096389 A1 | 4/2012 | Flam et al. | |
| 2012/0221421 A1 | 8/2012 | Hammad | |
| 2012/0239942 A1 | 9/2012 | Yan | |
| 2012/0278388 A1 | 11/2012 | Chiu | |
| 2012/0321086 A1 | 12/2012 | D'souza et al. | |
| 2012/0323750 A1 | 12/2012 | Sivaramakrishnan et al. | |
| 2012/0324237 A1 | 12/2012 | D'souza et al. | |
| 2013/0124853 A1 | 5/2013 | Sorotokin et al. | |
| 2013/0156188 A1 | 6/2013 | Xu et al. | |

OTHER PUBLICATIONS

D'Souza, Jao, Mironov, Pandey: Publicly Verifiable Secret Sharing for Cloud-Based Key Management. Indocrypt 2011.

Boneh, Segev, Waters: Targeted malleability: homomorphic encryption for restricted computations. ACM 2012.

Dara: Cryptography Challenges for Computation in Public Clouds. IACR Eprint 2013.

Chen: CloudHKA: A Cryptographic Approach for Hierarchical Access Control in Cloud Computing. ANCS'13 2013.

Junru Hu, Xu An Wang, Minquing Zhang, "Toward constant size CCA-secure multi-hop proxy re-encryption," Jul. 5-10, 2010, IEEE Signal Processing Systems (ICSPS), 2010 2nd International Conference, vol. 1 No., pp. V1-603, V1-605.

Libert, B.; Vergnaud, D., "Unidirectional Chosen-Ciphertext Secure Proxy Re-Encryption", Mar. 2011, Information Theory, IEEE Transactions, vol. 57, No. 3, pp. 1786, 1802.

\* cited by examiner

ORIGINATOR PUBLISHING AN ATTESTATION OF A STATEMENT

RELATED APPLICATIONS

This application is a continuation-in-part (CIP) of U.S. patent application Ser. No. 14/171,682, filed Feb. 3, 2014, and titled "Mediator Monitoring and Controlling Access to Electric Content", which a continuation of U.S. patent application Ser. No. 13/716,351, filed Dec. 17, 2012, and entitled "Monitoring and Controlling Access to Electronic Content", which is a continuation-in-part (CIP) of U.S. patent application Ser. No. 13/613,080, filed Sep. 13, 2012, and entitled "Providing Trustworthy Workflow Across Trust Boundaries" which claims priority to U.S. Provisional Patent Application No. 61/598,071, filed Feb. 13, 2012, and entitled "High-Scale and Distributed Business and Consumer Networks," all of which are incorporated herein by reference.

FIELD OF THE DESCRIBED EMBODIMENTS

The described embodiments relate generally to electronic communication through cloud networks. More particularly, the described embodiments relate to methods, systems and apparatuses of an originator publishing an attestation of a statement.

BACKGROUND

Any communication or sharing through the cloud will require any party involved to have convenient and reliable access to the public keys of any other parties that the first party may be communicating with, or the public keys of any service providers. In addition, it may be necessary for that party to have convenient and reliable access to the revocation status of these public keys. There are a variety of solutions that provide directories for looking up these public keys, and then associating attributes such as identities, authorization and roles to those keys. These include X.500 directories, enterprise and cloud directories provided by cloud vendors such as Microsoft and Google. However for business and other reasons there is a trend for these vendors to develop their own silos of solutions that use technologies specific to their business interests. This trend is likely to grow as technologies proliferate. There is a need to create and deploy 'meta directories' that can straddle multiple silos of directories that may use disparate technologies and/or be geographically located in disparate locations. These 'meta directories' need to be constructed in a manner that enhances the convenience of getting access to the aggregate data, but to also improve the reliability and security such that there is a lower likelihood of these 'meta directories' making mistakes or introducing additional threats.

It is desirable to have methods, systems and apparatuses for an originator to publish an attestation of a statement.

SUMMARY

An embodiment includes a method of an originator publishing an attestation of a statement. The method includes obtaining, by a computing device, information, wherein the information includes the attestation of the statement, wherein the statement includes at least a portion of the information to be attested to, and wherein the attestation includes a context describing conditions of the attestation, and wherein the attestation includes a cryptographic signature of the context and the statement. The method further includes validating the information, by the computing device, including validating a syntax of the information, comprising validating a structural integrity of the information, validating semantics of the structural information, comprising determining whether the information satisfies a condition as defined by a pre-selected level of importance, and validating the cryptographic signature of the attestation, comprising associating a public key published by the originator with the cryptographic signature of the attestation. The method further includes communicating after validating the information, by the computing device, the information to a destination while maintaining at least one of data privacy or data provenance, including creating a new statement by transforming the statement to a form suitable for the destination, creating, by the computing device, a new attestation by signing the new statement with a new context specific to the computing device, and making available the new attestation to the destination.

Another embodiment includes an originator computing device operative to publish an attestation of a statement. For this embodiment, the originator computing device is operative to obtaining information, wherein the information includes the attestation of the statement, wherein the statement includes at least a portion of the information to be attested to, and wherein the attestation includes a context describing conditions of the attestation, and wherein the attestation includes a cryptographic signature of the context and the statement. The computing device is further operative to validate the information, including validating a syntax of the information, comprising validating a structural integrity of the information, validating semantics of the structural information, comprising determining whether the information satisfies a condition as defined by a pre-selected level of importance, and validating the cryptographic signature of the attestation, comprising associating a public key published by the originator with the cryptographic signature of the attestation. The computing device is further operative to communicate after validating the information, the information to a destination while maintaining at least one of data privacy or data provenance, including creating a new statement by transforming the statement to a form suitable for the destination, creating, by the computing device, a new attestation by signing the new statement with a new context specific to the computing device, and making available the new attestation to the destination.

Other aspects and advantages of the described embodiments will become apparent from the following detailed description, taken in conjunction with the accompanying drawings, illustrating by way of example the principles of the described embodiments.

DETAILED DESCRIPTION

The described embodiments include methods, systems and apparatuses for publishing an attestation of a statement. For an embodiment, this attestation is directly provided from one party to another. For an embodiment, the attestation is provided to multiple other parties. For at least some embodiments, originators can discover statements in directory silos and make them more broadly available by optionally leveraging mediation, thereby serving as trustworthy intermediaries, and thereby providing the ability to create a 'meta directory.'

Figure 1:
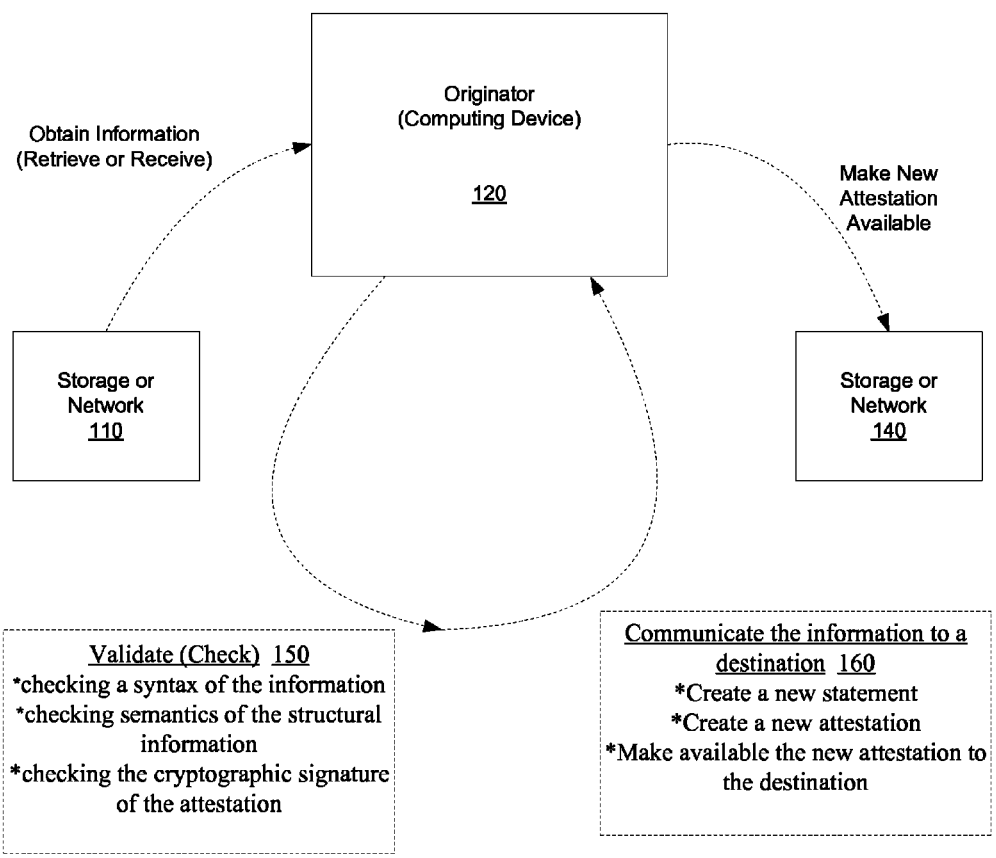
FIG. 1 shows an originator publishing an attestation of a statement, according to an embodiment.

FIG. 1 shows an originator publishing an attestation of a statement, according to an embodiment. As shown, a computing device (Originator) 120 obtains the information, which includes the attestation of the statement. For an embodiment, the originator 120 actively retrieves (pulls) the information from storage or a network 110. For another embodiment, the originator receives (push) the information from the storage or network 110. For at least some embodiments, the statement includes at least a portion of the information to be attested to, and the attestation includes a context describing conditions of the attestation, and the attestation includes a cryptographic signature of the context and the statement.

For at least some embodiments, the originator includes at least one of a user, a service, a device (such as, for example, a smartphone, a car computer, a smoke detector, an iWatch etc.) or a coalition of users, devices and/or services.

For an embodiment, a public key is associated with the attestation. For an embodiment, the statement includes an attribute and a value pair. For an embodiment, the cryptographic signature is generated during a signing operation.

For an embodiment, the originator (computing device) 120 validates the information. For at least some embodiments, validating the information (150) includes validating a syntax of the information, includes validating a structural integrity of the information, validating semantics of the structural information, including determining whether the information satisfies a condition as defined by a pre-selected level of importance. The preselected level of importance can be used, for example, for avoid information that includes, for example, SPAM. For at least some embodiments, validating the information further includes validating the cryptographic signature of the attestation, including associating a public key published by the originator with the cryptographic signature of the attestation.

For an embodiment, the originator (computing device) 120 communicates (160) after validating the information, the information to a destination while maintaining at least one of data privacy or data provenance. For at least some embodiments, data provenance includes the signing of the new attestation after transforming the received attestation to a form suitable for the destination. For at least some embodiments, the destination includes at least one of a user, a service, or a coalition of users and/or services.

For at least some embodiments, the originator (computing device) 120 communicating (160) further includes creating a new statement by transforming the statement to a form suitable for the destination. As will be described, for an embodiment, this includes mediated signing.

For at least some embodiments, the originator (computing device) 120 communicating (160) further includes creating a new attestation by signing the new statement with a new context specific to the computing device. For an embodiment, re-signing provides for maintenance of data provenance that may have been lost during the transformation. For an embodiment, creating a new attestation by signing the new statement with a new context specific to the computing device is facilitated by a mediator. For at least some embodiments, the Mediator serves an important function of validating in real-time the eligibility of the publisher and the validity of the attestation, but without being able to unilaterally impersonate the originator and sign the attestation. At least some embodiments include multiple mediators. For at least some embodiments, the multiple mediators include mediation circuits (logic) such as thresholds, where a subset of the mediators needs to be available and to co-operate for the signing.

For at least some embodiments, the originator (computing device) 120 communicating (160) further includes making available the new attestation to the destination (such as, storage or network 140). For an embodiment, making available the new attestation to the destination is facilitated by mediated decryption. For at least some embodiments, one or mediators needs to co-operate with the destination to enable the destination to access to the attestation. At least some embodiments include a plurality of mediators that that include circuits (logic) such as thresholds, wherein a subset of the mediators is available to co-operate for the decryption. The mediator decryption serves an important function of validating in real-time the eligibility of the subscriber, without being able to impersonate the subscriber and obtain access the attestation.

For at least some embodiments, there is separation of control between the mediator and the subscriber such that it is insufficient for a hostile party (such as a hacker or malware) to successfully execute an intrusion if the hostile party were to just compromise the mediator or the subscriber in isolation. Since the mediator and the subscriber can be geospatially separated, it is a significant burden for a hostile party to compromise both participants. Furthermore, for at least some embodiments, there is more than one Mediator that needs to participate, which provides additional safeguards against determined and sophisticated hostile parties.

For at least some embodiments, the new attestation aids the destination in validating the statement. For an embodiment, the originator is establishing in the new attestation that the originator received the statement at a particular time, or in a particular location. For an embodiment, the originator may have made other checks (perhaps out-of-band) to validate the statement, or the reputation of the source that made the statement. For example, the originator may look across multiple directories in disparate locations such as China or Russia or the US to validate the statement. Furthermore, if some of these locations are restricted, such as a government database, the originator may possess special permissions to make these checks on behalf of the destination. If this were part of a financial transaction, the originator may check appropriately for sufficient funds and solvency.

For at least some embodiments, the originator aids the destination in validating the completeness of statements by attesting that the originator has performed an exhaustive search on all remote silos and is also presenting the attestation with the correct temporal ordering as when the original attestations were made.

For at least some embodiments, communicating further includes the computing device replacing the statement with an attestation of a new statement that is a derivative of the statement. For an embodiment, the original statement leaks either the identity or privacy. For this embodiment, the originator makes a new statement that the originator "seen something" and is attesting to this fact, but without disclosing what the originator has seen.

For at least some embodiments, the originator encrypts a portion of the statement before attestation. This can occur, for example, when the original statement contains confidential information, and the originator has looked at this original statement, but is now encrypting it in a manner that restrict access to the statement, but the attestation from the originator, provides the destination with sufficient confidence through the attestation that is made available.

For at least some embodiments, the originator includes a user and a mediator that collaborate to generate the cryptographic signature; wherein the mediator's collaboration is contingent upon a condition. For an embodiment, the condition includes a rating of the user. Note that for an embodiment, in the absence of this mediation, the non-mediated originator can publish any statement, and the destination relies on the signature of the originator and perhaps use other sources of information to determine if they can believe the originator. However, with mediation through a mediator, the mediator can make some of these checks proactively, thereby adding more credibility to the attestation that is jointly created between the originator and the mediator. For example, the destination may typically need to perform complex and time consuming operations such as path discovery and verification in order to validate signature chains. Path discovery is the technique of checking (validating) the validity of an attestation, checking (validating) the validity of the key used to sign the attestation, checking (validating) the validity of the key used to attest the key used to sign, recursively all the way up to a known common root key that is globally visible. Path verification is traversing that previously discovered path from the root key, down to the attestation, to check the authorizations (such as permission to sign a subordinate key) at every stage. This is a complex and slow technique. The actions by the originator obviate the need for the destination to perform these complex steps. Therefore if the mediator helps establish this validity the destination can rely on the mediator to have performed these checks. Furthermore, for at least some embodiments, the mediator is instrumental in directing where this new attestation is made available, which could potentially add to the privacy, and reduce the "SPAM" factor. In a sense the mediator is "pre-digesting" work that would otherwise need to be done by the destination. For an embodiment, this is facilitated by mediated signing.

For at least some embodiments, creating a new attestation by signing is facilitated by the mediator. For an embodiment, this is facilitated by mediated signing.

For at least some embodiments, making available the new attestation to the destination is facilitated by the mediator. For an embodiment, this is facilitated by mediated decryption.

For an embodiment, the attestation of the statement is conditionally based on time. For an embodiment, this is facilitated by a mediator. That is, for example, for an embodiment, the originator may claim that the statement was valid at a particular time, or was communicated at a particular time, and the mediator checks the veracity and agree to mediate if the mediator is convinced that the claim is true. The mediation could add functionality such as embargo (where an attestation becomes available only after the elapse of time, or an occurrence of some external event) or leases and expiration (where the attestation is valid for only a specified time period, or till the occurrence of some external event).

For an embodiment, the attestation of the statement is conditionally based on external actions. That is, for example, for an embodiment, the originator may claim that the statement was valid based on a particular external action, and the mediator checks the veracity and agree to mediate if the mediator is convinced that the claim is true. For example, for an embodiment, for a financial transaction the publisher makes a statement about having sufficient funds to be permitted to initiate that transaction, and the Mediator might check with an authority such as the publisher's financial institution, to validate the statement before co-operating.

For at least some embodiments, the publishing of the attestation is done to a trustworthy workspace. A workspace is deemed trustworthy if it has properties that prevent inappropriate additions or modification through perhaps cryptographic mechanisms that might include signature schemes. For at least some embodiments, the trustworthy workspace is effectively the collection of attestations that is made available to the destination. For an embodiment, the workspace is trustworthy because the originator (and optionally the mediator) has attested to the statements contained within the workspace. For an embodiment, the trustworthy workspace includes a directory. For an embodiment, the directory is a well-known location for the destination that provides some standard access interface such as X.500, LDAP, or some cloud directory.

Figure 2A:
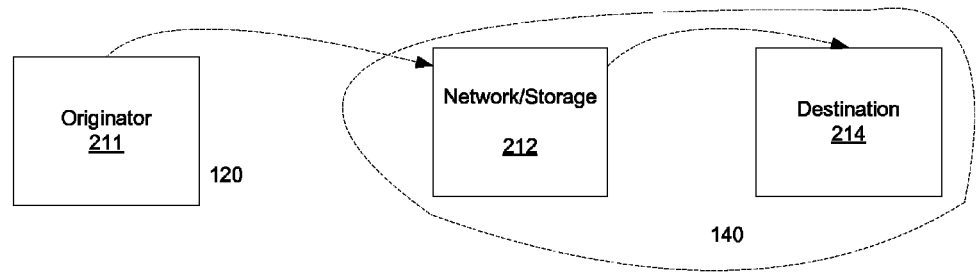
FIGS. 2A, 2B, 2C show different configurations of an originator publishing an attestation of a statement based on the topologies of the originators and destinations of the attestations, according to some embodiments.
Figure 2B:
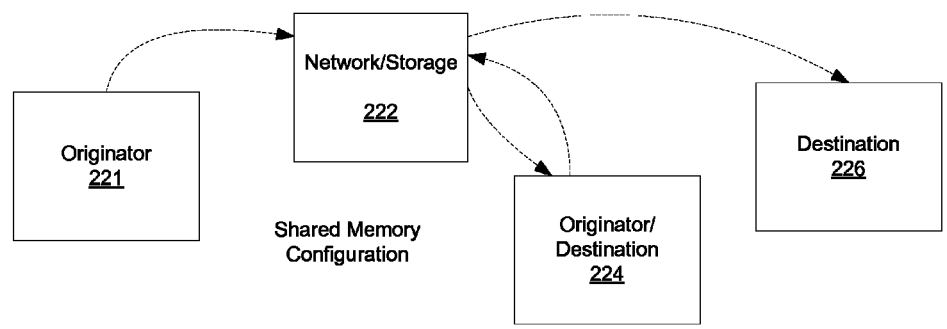
Figure 2C:
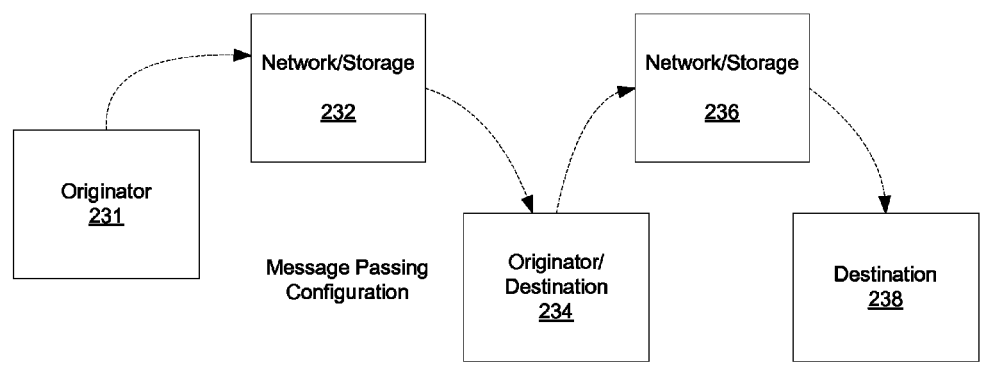

FIGS. 2A, 2B, 2C show different configurations of an originator publishing an attestation of a statement, according to some embodiments. For example in FIG. 2A an originator (211) provides the attestation of the statement to a network/storage (212) that is co-located with the destination (214). In FIG. 2B, there is a central "hub-like" network/storage (222) that is accessed by an originator (221) or an originator/destination (224) (also referred to as "shared memory") or a destination 226. In FIG. 2C, there are silos of network/storage (232 and 236) that are bridged by originators (231, 234) (also referred to as "message passing"). Destination 238 is also connected to the network/storage 236. A least some embodiments include hybrids that are composed of variation of FIG. 2B and FIG. 2C.

Figure 3A:
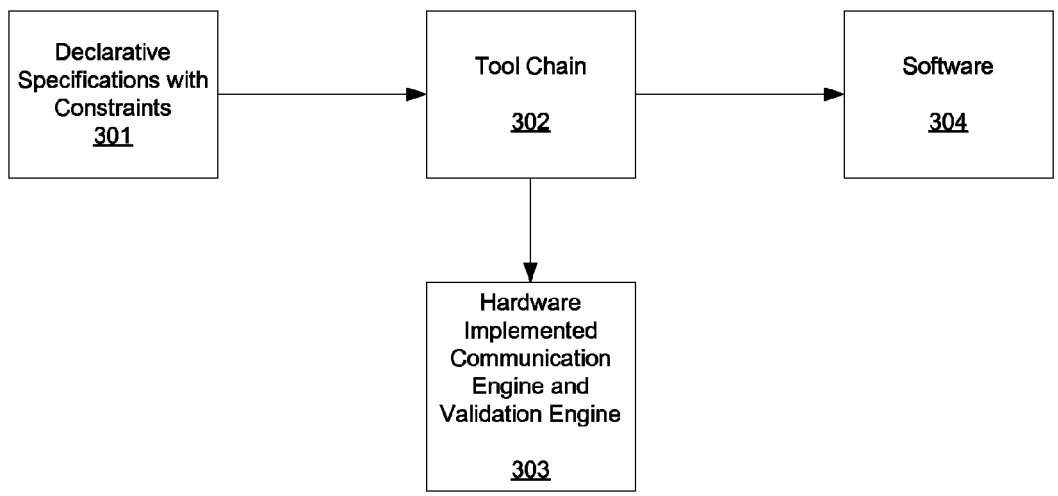
FIG. 3A shows a flow of processing for enabling an originator to publish an attestation of a statement, according to an embodiment.

FIG. 3A shows a flow of processing for enabling an originator to publish an attestation of a statement, according to an embodiment. A first function 301 includes declarative specifications with constraints that are received by a tool chain 302. The tool chain 302 is interfaced with a hardware implementation 303 of a validation engine and a communication engine. The tool chain 302 is additionally interfaced with software 304.

For at least some embodiments, the declarative specifications with constraints of the function 301 include a Domain Specific Language (DSL) implemented using a programming language such as Haskell, which is operable to use the tool chain (302) to either compile or interpret to generate conventional software or binaries (304), or for the tool chain 302 to generate a hardware description language such as VHGL or Verilog that can be used to deliver hardware that could include Field Programmable Gate Arrays (FPGAs) or Application Specific Integrated Circuits (ASICs). For at least some embodiments, functionality implemented by the originator is implemented in hardware that enables several properties that include tamper resistance (such as immunity from malware and other classes of security attacks). As a result the destination has significantly higher confidence in the attestations provided since it is less likely that there could be a security breach at the originator.

Figure 3B:
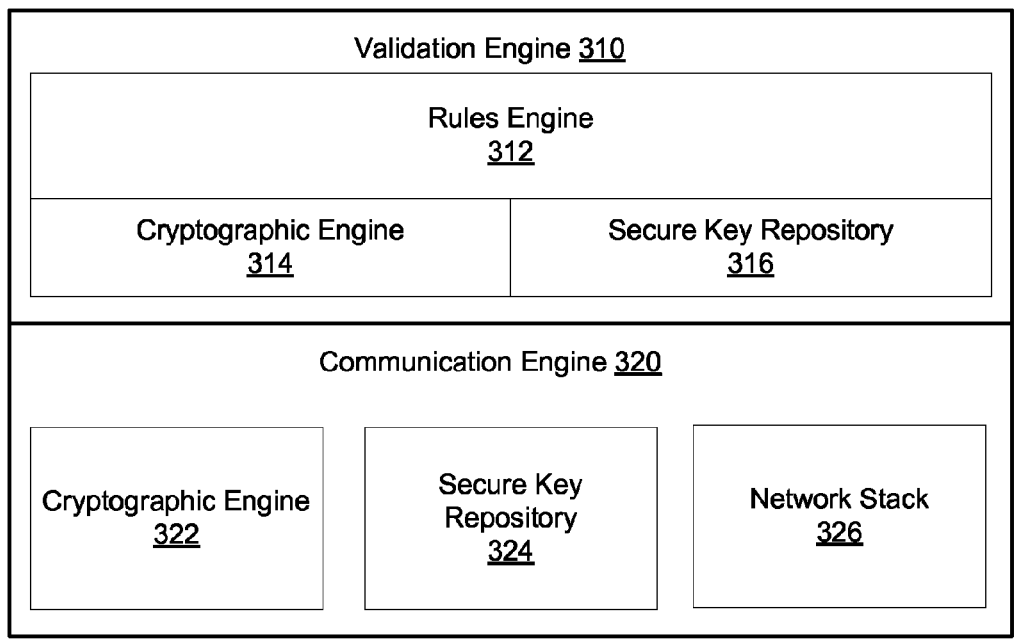
FIG. 3B shows a hardware implementation of a validation engine and a communication engine that enable an originator to publish an attestation of a statement, according to an embodiment.

FIG. 3B shows a hardware (for example, FPGA or ASIC) implementation of a validation engine 310 and a communication engine 320 that enable an originator to publish an attestation of a statement, according to an embodiment. For at least some embodiments, the hardware implementation of the validation engine 310 and the associated mediation is implemented using field programmable gate arrays (FPGAs), application specific integrated circuits (ASICs), and/or other similar hardware implementations. These hardware implementations cannot be easily tampered after it is constructed, hence are immune to most forms of malware (since malware is software and cannot modify hardware).

As shown, for this embodiment, the validation engine 310 includes a rules engine 312, a cryptographic engine 314, and a secure key repository 316. For an embodiment, the rules engine 312 includes an engine that performs inferences perhaps using forward or backward chaining, with the rules codifying the precise behavior of the originator. For at least some embodiments, the cryptographic engine 314 provides functionality such as signing and signature verification, or encryption and decryption, for use by the rules engine 312. For an embodiment, the secure key repository 316 includes a storage area for saving and retrieving the cryptographic keys required for signing, verification, encryption or decryption.

Further, as shown, for this embodiment, the communication engine 320 includes a cryptographic engine 322, a secure key repository 324, and a network stack 326. For an embodiment, the communication engine 320 uses either the cryptographic engine 314 or its own specialized cryptographic engine 322 that it would use for securely communicating with originators and destinations. Similarly, for an embodiment, the communication engine 320 uses either the secure key repository 316 or have its own secure key repository 324 for saving and retrieving cryptographic keys required for communications security. Finally, for an embodiment, the network stack 326 provides the network protocols, such as TCP/IP, for the validation engine of the originator to communicate with originators and destinations.

For at least some embodiments, the cryptographic engine 322 in the communication engine 320 provides the encryption/decryption and signing/verification functionality for providing communication security that could use protocols such as HTTPS or IPSec such that no malicious party between the originator and the destination can eavesdrop, or spoof either party through Man-in-the-Middle attacks. For at least some embodiments, the secure key repository 324 is for use by the cryptographic engine 322 to store and retrieve cryptographic keys required for this secure communication. For at least some embodiments, the network stack 326 is the implementation of communication protocols such as TCP/IP for the Originator to talk to any Destination.

As previously stated, FIG. 3B shows a hardware implementation of a validation engine 310 and a communication engine 320 that enable an originator to publish an attestation of a statement. The communication engine 320 obtains information, wherein the information includes the attestation of the statement, wherein the statement includes at least a portion of the information to be attested to, and wherein the attestation includes a context describing conditions of the attestation, and wherein the attestation includes a cryptographic signature of the context and the statement.

Further, the validation engine 310 validates the information. For at least some embodiments, this includes the rules engine 312 validating a syntax of the information, which includes validating a structural integrity of the information, the rules engine 312 validating semantics of the structural information, comprising determining whether the information satisfies a condition as defined by a pre-selected level of importance, and the rules engine 312 validating the cryptographic signature of the attestation, comprising associating a public key published by the originator with the cryptographic signature of the attestation.

Further, for at least some embodiments, the communication engine 320 communicates the information to a destination after the validating, while maintaining at least one of data privacy or data provenance.

Further, for at least some embodiments, the rules engine 312 creates a new statement by transforming the statement to a form suitable for the destination, the communication engine 320 creates a new attestation by signing the new statement with a new context specific to the computing device, and the rules engine 312 in conjunction with the cryptographic engine 314 make available the new attestation to the destination.

The DSL and tool chain 302 shown in 3A enables the construction and deployment of hardware-based originators that can be significantly faster in performance (lower latencies and higher throughput of operations performed by the Originator). These deployments configured in hardware 303 can be resistant against software-based malware, trojans and other attacks that could infect and subvert a conventional delivery (such as software 304). Furthermore, by constructing the validation engine 310 using selection of FPGAs provides significant tamper resistance capabilities where it would be very difficult, if at all possible, for a physical attacker (that is, a human) to be able to modify and subvert a hardware-based deployment 303 even if that human were to have physical possession of this hardware (short of physically destroying it and rendering it non-operational.)

Figure 4:
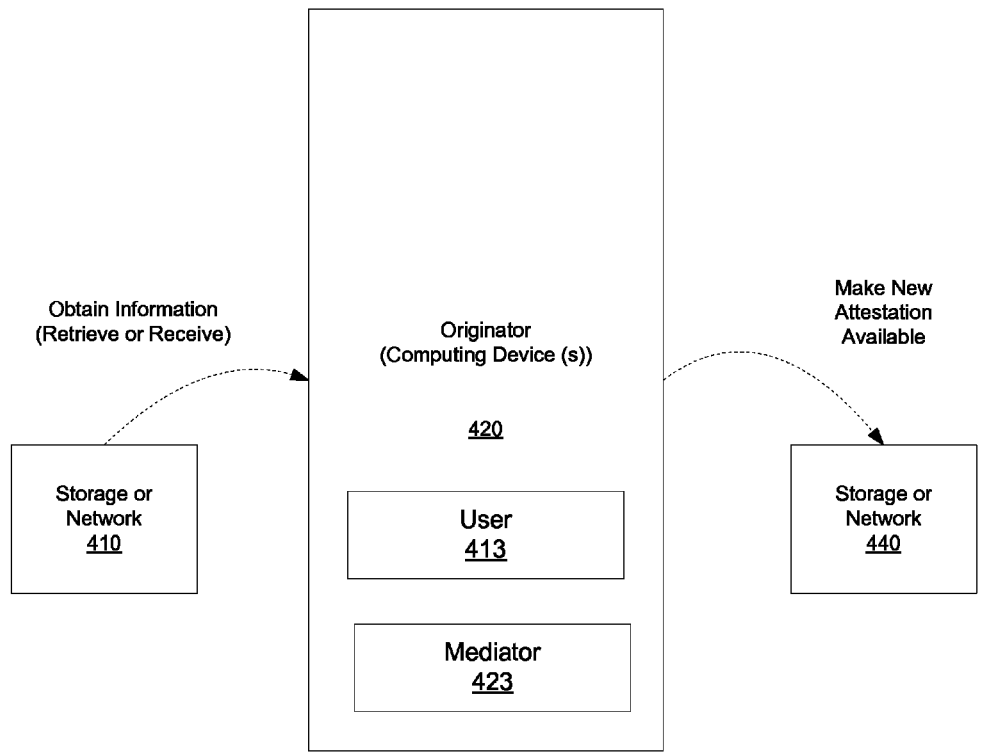
FIG. 4 shows an originator publishing an attestation of a statement wherein the originator further includes a mediator, according to an embodiment.

FIG. 4 shows an originator publishing an attestation of a statement wherein the originator further includes a mediator, according to an embodiment. As shown, for an embodiment, the originator 420 includes both a user 413 and a mediator 423. For at least one embodiment, the mediator (423) receives or retrieve information (from, for example, storage or network 410) and optionally checks the validity of the statement and also optionally checks externally for validating, before the mediator 423 co-operates with the user (413) to generate the attestation that is sent to the destination (440).

Figure 5:
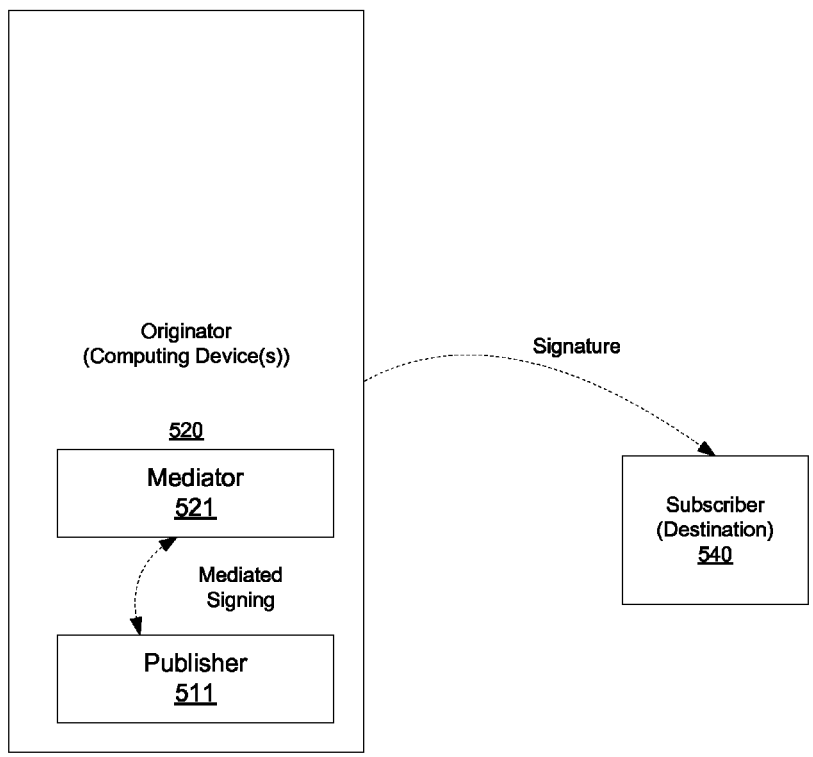
FIG. 5 shows an originator publishing an attestation of a statement, which further includes mediated signing, according to an embodiment.

FIG. 5 shows an originator 520 publishing an attestation of a statement which further includes mediated signing, according to an embodiment. For an embodiment, at least one mediator (521) optionally checks the validity of the statement and also optionally checks externally for validating, before it co-operates with the publisher (511) to generate the attestation that is sent to the destination (540).

Figure 6:
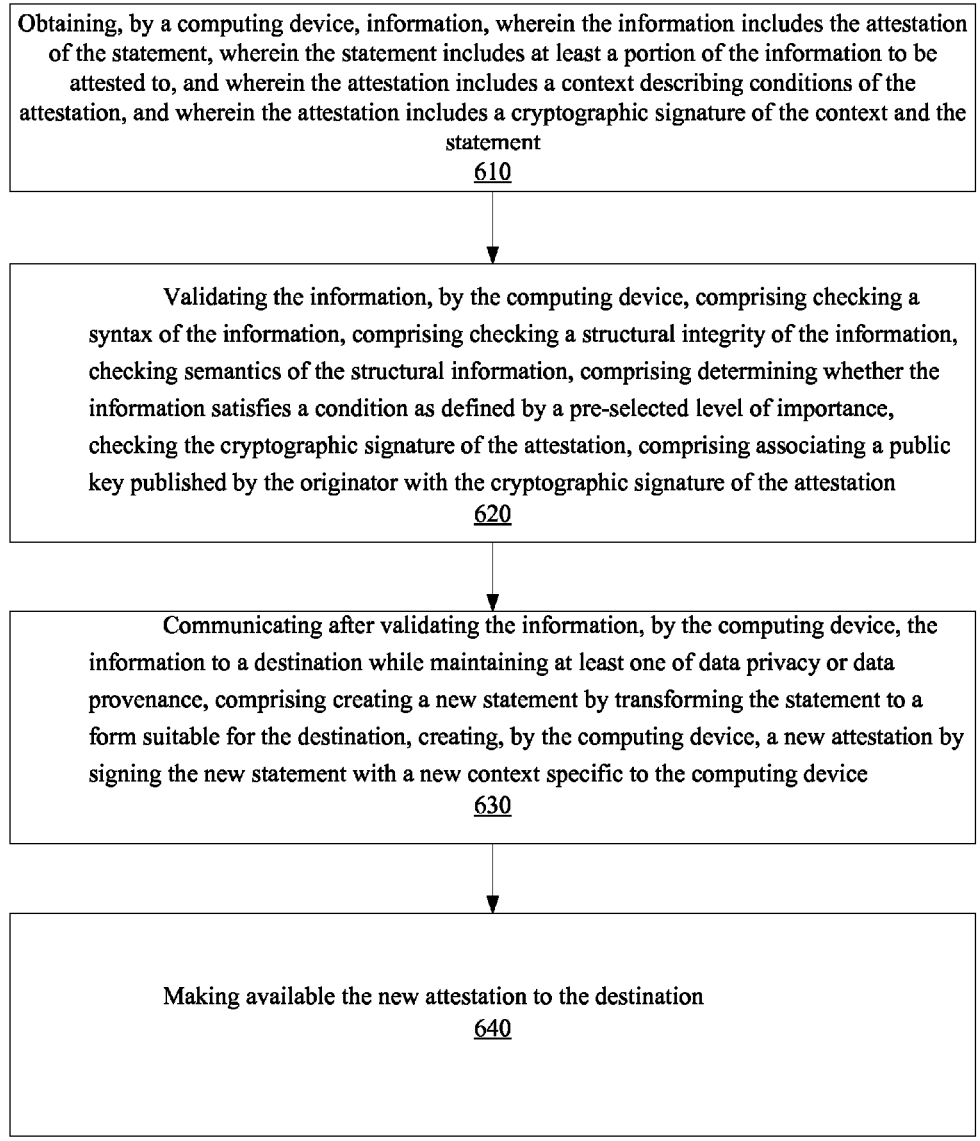
FIG. 6 is a flow chart that shows steps of a method of an originator publishing an attestation of a statement, according to an embodiment.

FIG. 6 is a flow chart that shows steps of a method of an originator publishing an attestation of a statement, according to an embodiment. A first step 610 includes obtaining, by a computing device, information, wherein the information includes the attestation of the statement, wherein the statement includes at least a portion of the information to be attested to, and wherein the attestation includes a context describing conditions of the attestation, and wherein the attestation includes a cryptographic signature of the context and the statement. A second step 620 includes validating the information, by the computing device, including validating a syntax of the information, comprising validating a structural integrity of the information, validating semantics of the structural information, comprising determining whether the information satisfies a condition as defined by a pre-selected level of importance, and validating the cryptographic signature of the attestation, comprising associating a public key published by the originator with the cryptographic signature of the attestation. A third step 630 includes communicating after validating the information, by the computing device, the information to a destination while maintaining at least one of data privacy or data provenance, including creating a new statement by transforming the statement to a form suitable for the destination, creating, by the computing device, a new attestation by signing the new statement with a new context specific to the computing device. A fourth step 640 includes making available the new attestation to the destination.

As previously described, for at least some embodiments, the new attestation aids the destination in validating the statement.

As previously described, for at least some embodiments, the communicating further includes the computing device replacing the statement with an attestation of a new statement that is a derivative of the statement.

As previously described, for at least some embodiments, the originator encrypts a portion of the statement before attestation.

As previously described, for at least some embodiments, the originator includes a user and a mediator that collaborate to generate the cryptographic signature; wherein the mediator's collaboration is contingent upon a condition. As previously described, for at least some embodiments, the condition comprises a rating of the user.

As previously described, for at least some embodiments, creating a new attestation by signing is facilitated by the mediator.

As previously described, for at least some embodiments, making available the new attestation to the destination is facilitated by the mediator.

As previously described, for at least some embodiments, the attestation of the statement is conditionally based on time. As previously described, for at least some embodiments, the attestation of the statement is conditionally based on external actions.

As previously described, for at least some embodiments, the publishing of the attestation is done to a trustworthy workspace. As previously described, for at least some embodiments, the trustworthy workspace comprises a directory.

At least one benefit of the described embodiments includes the ability for individuals and organizations to leverage the benefits of clouds and other networks, which include lower costs, higher scale, and geo-distribution, in order to maximize their own efficiencies that might include lower capital and operational expenses.

There exist several collaboration and commerce networks that can benefit from the lower costs, scale and geo-distribution of clouds. These networks include supply and demand chains, and international trade. In the present day there is a precise support system that includes banks, escrow parties, shipping corporations, and mediation. However these do not scale for electronic commerce, when it is necessary for a human to be a mandatory intermediary for any typical transaction (as opposed to a human needing to get involved in the case of an error or a conflict).

Due to the replacement of that the previously described incompatible directories or silos of directories with a 'meta directory' that is orchestrated through originators that bridge sources and destinations, it is now easier for diverse technologies and solutions to integrate and inter-operate, since each spoke needs to perform a one-time integration with the meta directory. In addition, it is possible for the hub (the meta directory) to present a variety of interfaces to the spokes (such as a conventional directory interface), and then perform the routing and inter-operation within the hub (the meta directory, orchestrated across one or more physically networks/storage). In deployment scenarios with multiple hubs, each hub might implement a specific class of technologies. For an embodiment, this includes an aggregate meta-directory that is comprised of multiple hubs (meta directories).

At least some embodiments include interactions between the publisher and the mediator in order to orchestrate mediated signing. To facilitate this, for an embodiment, an owner (administrator) curator enables publishers to be in a group and to be able to subsequently interact with the mediator to generate an attestation. For at least some embodiments, a group is a convenience for the owner (administrator) curator to uniformly enable any constituent of that group to have permissions for initiating a subsequent mediated signing operation.

Figure 7:
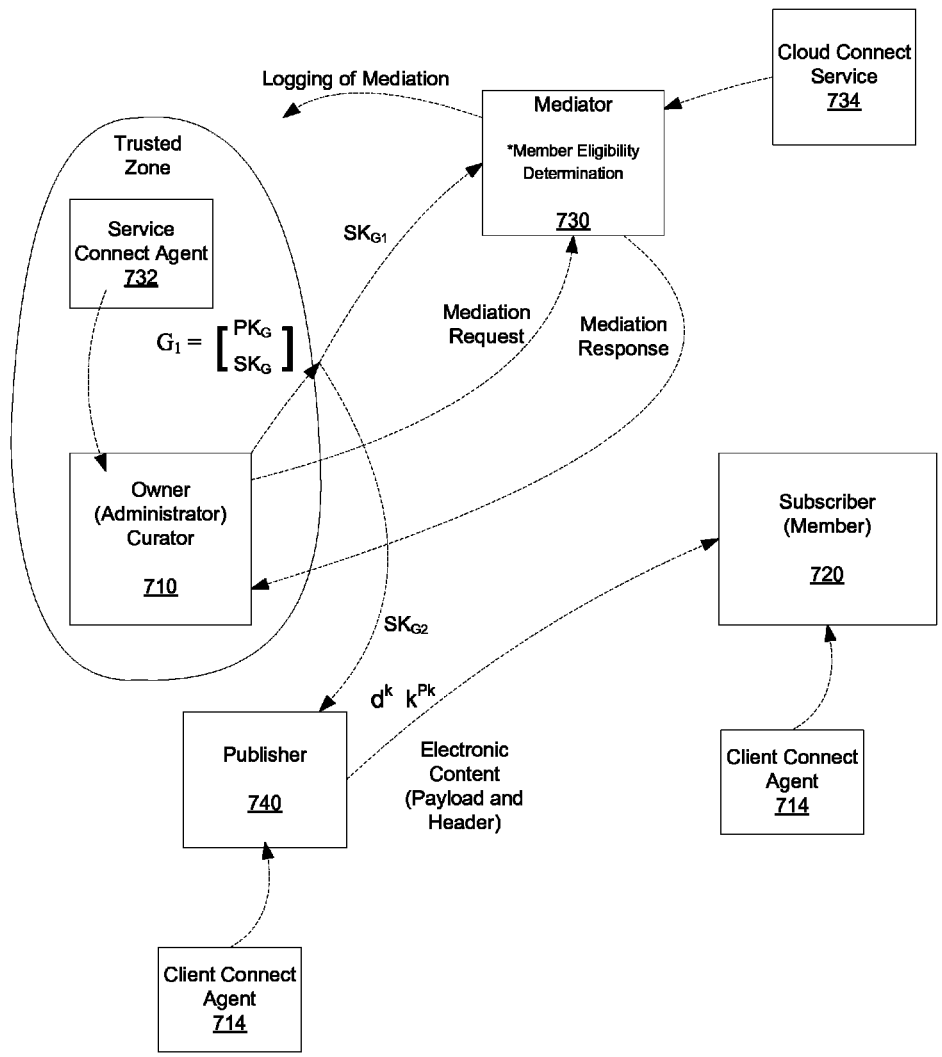
FIG. 7 shows a system that provides for monitoring and control of access to an electronic content that includes mediator co-operation, according to an embodiment.

FIG. 7 shows a system that provides for monitoring and control of access through Mediated signing to an electronic content (an attestation), according to an embodiment. As shown, the system includes an owner 710, a member 720, and a mediator 730. An embodiment includes the formation of a group, wherein the group allows for the sharing and collaboration of a document (an attestation), or more generally, electronic content. The group is formed by the owner 710. For an embodiment, formation of the group includes the owner 710 publishing a group public key $PK_G$, and generating and maintaining a group secret key $SK_G$ as a secret. The owner can store the group secret key $SK_G$, for example, in its own data center.

Further, the member 720 and the mediator 730 each publish their own public keys, and maintain corresponding secret keys as a secret. The member 720 and the mediator 730 can each secure their secret key by protecting the secret key through encryption before storing or transmitting the secret key to a custodian. That key encryption key can be derived from a pass phrase that only the principal (originator of the secret key) knows.

Once the group has been formed, the owner 710 adds members (such as member 720) by generating a first share $SK_{G1}$ from the group secret key $SK_G$ and a public key of a member, and a second share $SK_{G2}$ from the group secret key $SK_G$ and a public key of a mediator. The owner 710 adds the member to the group by obtaining the member's public key from the mediator (or some other public source).

Once the group has been formed and the owner 710 has published the group public key $PK_G$, a publisher 740 can sign a document (more generally, electronic content) using the group public key $PK_G$. For an embodiment, the document consists of an attestation of a statement. For an embodiment, the user retrieves the group public key $PK_G$ from a custodian (owner 710), wherein the custodian is operating in the directory role. For an embodiment, the document is signed according to a key K, and the key K is signed according to the group public key $PK_G$.

The member 720 (subscriber) can obtain the document (signed attestation of a statement) in various ways. The publisher 740 may send the document to the member 720, the member 720 may retrieve the document, or there may be an intermediary, such as, a network/storage that might include a conventional directory, such as X.500 or AD, between the publisher 740 and the member 720.

In another embodiment, a user server publishes the actual payload to a location that is resilient against inappropriate access or modification, or because the payload is too voluminous for transmission in the data path, and publishing a capability for gaining access in lieu of the payload, and the member server consequently requiring mediation in order to access that capability for gaining access to the payload.

In certain situations where there is a pre-defined data path, such as a network/storage such as a directory service that might include Microsoft Azure Active Directory as an example, the document, and the associated metadata is best packaged as a single unit that travels together. The original document that contains the signed statement is termed the 'payload', and the header contains the cryptographic material and any associated document classifications and/or access policies.

In other situations where the digital content is too unwieldy to share through a solution such as Microsoft Azure® AD, either due to the size, or to the streaming nature of access, it may be better to replace the payload with an address that is located in the directory. In this situation, the header contains a capability that constitutes both a location that is otherwise difficult to guess, along with the cryptographic material for an authorized party to perform cryptographic operations such as verification and decryption. In this case there might be other benefits, such as tamper prevention, since lack of access to that capability would typically preclude accidental or malicious defacement or deletion, where defacement renders that original content inaccessible.

Once the mediator 730 receives the request for mediation from the member 720, the mediator 730 checks to confirm that the member 720 is eligible for signing of the document. The eligibility of the member 720 can be determined in one or more ways.

One mechanism for determining member eligibility is for the mediator 730 to maintain a white list, or a black list of eligible members. Typically the owner 710, or the delegate or auditor updates this list. In this case the member 720 is eligible if they are on the white list, or if they are not on the black list, or both.

Another mechanism for determining member eligibility is for the mediator 730 to maintain a matrix of authorization, where one dimension of the matrix is the document classification, while the other dimension is the access requirements. The first might be transferred securely (and privately in some cases) from the publisher 740, to the mediator 730 through the header. The second might specify individuals (through a white or black list), or it might specify specific roles that a requestor needs to be member of, which is sometimes described as RBAC, or Role Based Access Control. The second might also specify a claim that the member 720 needs to provide to prove they have legitimate permissions to sign that document. This might be either an ancillary mechanism that is used in addition to group membership usually signs this claim, or it might be in lieu of group membership (where any member with the right claim will have access to that document). Some authority that the Mediator knows of can issue such a claim.

There are other mechanisms for the mediator 730 to determine eligibility of a member 720, which involve integration with existing enterprise and federation infrastructures. For example, in a policy-based network, the mediator 730 may serve as an enforcement point (or Policy Enforcement Point) that needs to check with one or more Policy Decision Points before it executes the mediation.

For an embodiment, the mediator 730 logs the requests by the member, eligibility determinations, and mediator responses. For an embodiment, the logging includes the mediator 730 storing the requests by the member, eligibility determinations, and mediator responses. Each of these can be logged at a server, wherein the server is accessible by the owner and others. For an embodiment, the logging includes the mediator dispatching alerts of the requests by the member, eligibility determinations, and mediator responses to the owner and others.

Due to the trustworthy nature of the hub, it is an enabler of fine-grain lifecycle management of electronic content (attestations), perhaps in cases where it might be a business record, and this facilitates the enforcement of retention, disposition, hold, and other events of data that is owned by an individual or organization, but is outside their region of control.

Based on the configuration, the hub may either log access requests (either ones that failed due to lack of eligibility, or both). These logs may be made available to just the parties authorized by the group owner, or their delegate or auditor. In other cases the logs may be delivered in the form of alerts to the group owner, or their delegate or auditor, in cases where there is a need for rapid notification.

If the mediator 730 determines that the member 720 is eligible, the mediator 730 responds to the request for mediation with a member accessible header, wherein the member accessible header includes the header after application of $SK_{G2}$.

Typically the logs and alerts from the hub are integrated with enterprise infrastructure that might range from Syslogd, to specialized monitoring and discovery solutions, or possibly to high-scale log processing systems that might post-process these logs for purposes that might include filtering, classification, pattern or anomaly detection. In many cases, a cloud or similar network can provide an end-to-end service that would significantly reduce any individual or organization's capital and operational expenses.

As shown, the mediator 730 is at least partially controlled by a cloud connect service (CCS) 734, the member 720 and the publisher 740 are at least partially controlled by a client connect agent (CCA) 714, and the owner 710 is at least partially controlled by a service connect agent (SCA) 732. The owner 610 operates within a trusted zone and the mediator operates within a partially trusted zone.

In some embodiments the CCS 734 centralizes roles that include Directory, Key Store, Mediator, Log Storage and Delivery, and others. In other embodiments a separate party that includes the owner operator or their organization or delegate hosts the Mediator.

It is to be understood that the roles of each of the parties (owner 710, member 720, mediator 730, publisher 740) can be changed, and/or the parties can play multiple roles. That is, for example, the member 720 can additionally play the role of owner. In some embodiments the group owner 710 represents more than one individual, whereby access to the group secret key itself is mediated in a similar operation.

Figure 8:
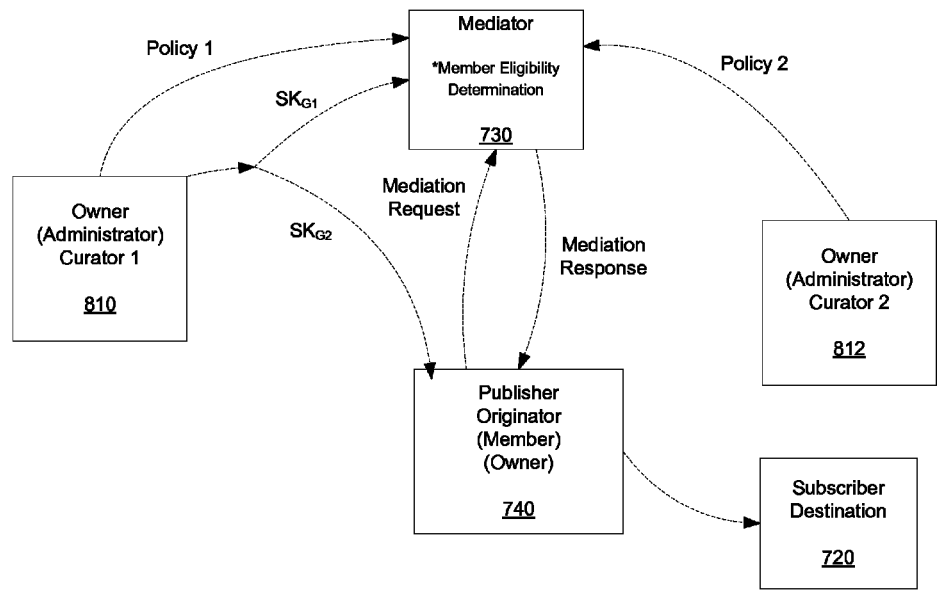
FIG. 8 shows another system that provides for monitoring and control of access to an electronic content that includes mediated signing according to an embodiment.

FIG. 8 shows another system that provides for monitoring and control of access to an electronic content, according to an embodiment. This embodiment includes a first owner 810 and a second owner 812. As shown, the first owner 810 provides a first policy and the second owner 812 provides a second policy for the mediator 730. This embodiment provides for extension to multiple owners (curators) and provides federation of the curators, wherein each owner (curator) is responsible for their own sets of content. While two owners are shown, the described embodiments are not limited to two owners. The electronic content is conveyed from the publisher 740 to the subscriber 720.

Typically in a scenario that involves collaboration or commerce, there are diverse, perhaps mutually distrustful participants that need to manage their own access policies that might include management of white or black lists, and perhaps ratings of buyers, sellers or other participants. These scenarios are "federated" and can consist of more than one owners might either have exclusive control over their respective sets of documents that they are the resource providers of, or it may be the case that they may have to co-operate through some policy to be able to update or modify the mediation policy.

Although specific embodiments have been described and illustrated, the embodiments are not to be limited to the specific forms or arrangements of parts so described and illustrated.

What is claimed:

1. A method of an originator publishing an attestation of a statement, comprising:
    obtaining, by a computing device, information, wherein the information includes the attestation of the statement, wherein the statement includes at least a portion of the information to be attested to, and wherein the attestation includes a context describing conditions of the attestation, and wherein the attestation includes a cryptographic signature of the context and the statement;
    validating the information, by the computing device, comprising:
        validating a syntax of the information, comprising validating a structural integrity of the information;
        validating semantics of the structural information, comprising determining whether the information satisfies a condition as defined by a pre-selected level of importance;
        validating the cryptographic signature of the attestation, comprising associating a public key published by the originator with the cryptographic signature of the attestation;
    communicating after validating the information, by the computing device, the information to a destination while maintaining at least one of data privacy or data provenance, comprising:
        creating a new statement by transforming the statement to a form suitable for the destination;
        creating, by the computing device, a new attestation by signing the new statement with a new context specific to the computing device; and
        making available the new attestation to the destination.

2. The method of claim 1, wherein the new attestation aids the destination in validating the statement.

3. The method of claim 1, wherein communicating further comprises the computing device replacing the statement with an attestation of a new statement that is a derivative of the statement.

4. The method of claim 1, wherein the originator encrypts a portion of the statement before attestation.

5. The method of claim 1, wherein the originator comprises a user and a mediator that collaborate to generate the cryptographic signature; wherein the mediator's collaboration is contingent upon a condition.

6. The method of claim 5, wherein the condition comprises a rating of the user.

7. The method of claim 1 wherein creating a new attestation by signing is facilitated by the mediator.

8. The method of claim 1 wherein making available the new attestation to the destination is facilitated by the mediator.

9. The method of claim 1, wherein the attestation of the statement is conditionally based on time.

10. The method of claim 1, wherein the attestation of the statement is conditionally based on external actions.

11. The method of claim 1, wherein the publishing of the attestation is done to a trustworthy workspace.

12. The method of claim 11, wherein the trustworthy workspace comprises a directory.

13. An originator computing device operative to publish an attestation of a statement, comprising the originator computing device operative to:
    obtain information, wherein the information includes the attestation of the statement, wherein the statement includes at least a portion of the information to be attested to, and wherein the attestation includes a context describing conditions of the attestation, and wherein the attestation includes a cryptographic signature of the context and the statement;
    validate the information, comprising;
        validating a syntax of the information, comprising validating a structural integrity of the information;
        validating semantics of the structural information, comprising determining whether the information satisfies a condition as defined by a pre-selected level of importance;
        validating the cryptographic signature of the attestation, comprising associating a public key published by the originator with the cryptographic signature of the attestation;
    communicate after validating the information, the information to a destination while maintaining at least one of data privacy or data provenance, comprising;
        creating a new statement by transforming the statement to a form suitable for the destination;
        creating, by the computing device, a new attestation by signing the new statement with a new context specific to the computing device; and
        making available the new attestation to the destination.

14. The originator computing device of claim 13, wherein the new attestation aids the destination in validating the statement.

15. The originator computing device of claim 13, wherein communicating further comprises the computing device replacing the statement with an attestation of a new statement that is a derivative of the statement.

16. The originator computing device of claim 13, wherein the originator encrypts a portion of the statement before attestation.

17. The originator computing device of claim 13, wherein the originator comprises a user and a mediator that collaborate to generate the cryptographic signature; wherein the mediator's collaboration is contingent upon a condition.

18. The originator computing device of claim 17, wherein the condition comprises a rating of the user.

19. The originator computing device of claim 13, wherein creating a new attestation by signing is facilitated by the mediator.

20. The originator computing device of claim 13 wherein making available the new attestation to the destination is facilitated by the mediator.

21. The originator computing device of claim 13, wherein the attestation of the statement is conditionally based on time.

22. The originator computing device of claim 13, wherein the attestation of the statement is conditionally based on external actions.

23. The originator computing device of claim 13, wherein the publishing of the attestation is done to a trustworthy workspace.

24. The originator computing device of claim 23, wherein the trustworthy workspace comprises a directory.

25. Electronic circuitry configured to publish an attestation of a statement, comprising:
   a validation engine;
   a communication engine interfaced with the validation engine; wherein
   the communication engine is configured to obtain information, wherein the information includes the attestation of the statement, wherein the statement includes at least a portion of the information to be attested to, and wherein the attestation includes a context describing conditions of the attestation, and wherein the attestation includes a cryptographic signature of the context and the statement;
   wherein the validation engine is configured to:
      validate a syntax of the information, comprising validating a structural integrity of the information;
      validate semantics of the structural information, comprising determining whether the information satisfies a condition as defined by a pre-selected level of importance;
      validate the cryptographic signature of the attestation, comprising associating a public key published by the originator with the cryptographic signature of the attestation;
   wherein the communication engine is further configured to communicate after validating the information, the information to a destination while maintaining at least one of data privacy or data provenance;
   wherein the validation engine is further configured to:
      create a new statement by transforming the statement to a form suitable for the destination;
      create a new attestation by signing the new statement with a new context specific to a computing device of an originator; and
      make available the new attestation to the destination.

* * * * *